Nov. 3, 1964 R. B. RICE 3,155,897

FAULT DETECTION SYSTEM HAVING A PORTABLE RADIO SIGNAL GENERATOR AND STATIONARY RADIO RECEIVER FOR DETECTING OPEN CIRCUITS IN AN ELECTRICAL CONDUCTOR

Filed Oct. 17, 1960 2 Sheets-Sheet 1

INVENTOR
ROBERT B. RICE
BY Harrington A. Lackey
ATTORNEY

FAULT DETECTION SYSTEM HAVING A PORTABLE RADIO SIGNAL GENERATOR AND STATIONARY RADIO RECEIVER FOR DETECTING OPEN CIRCUITS IN AN ELECTRICAL CONDUCTOR

Filed Oct. 17, 1960 2 Sheets-Sheet 2

INVENTOR
ROBERT B. RICE
BY
Harrington A. Lackey
ATTORNEY 3,155,897

FAULT DETECTION SYSTEM HAVING A PORTABLE RADIO SIGNAL GENERATOR AND STATIONARY RADIO RECEIVER FOR DETECTING OPEN CIRCUITS IN AN ELECTRICAL CONDUCTOR

Robert B. Rice, Chattanooga, Tenn., assignor to The Wheland Company, Chattanooga, Tenn., a corporation of Tennessee Filed Oct. 17, 1960, Ser. No. 63,182
9 Claims. (Cl. 324—52)

This invention relates to an apparatus for detecting faults in an electrical conductor and more particularly to a novel electronic apparatus for detecting breaks or open circuit conditions in a concealed electrical conductor or cable.

Heretofore various devices for detecting faults in electrical conductors have been devised in which a signal generator has been connected to the conductor and an electrical current impressed upon the conductor to establish an electrostatic or electromagnetic field about the conductor. Included in such devices are portable receivers or probes for picking up and tracing electrostatic or electromagnetic fields along the conductors until the fault is located at the point where no electrostatic or electromagnetic field exists. Most of these devices have portable receivers which are heavy and cumbersome and include a large number of electronic elements, such as a pickup-coil, several stages of amplifiers, and sometimes an oscillator, and a tuning mechanism.

It is therefore an object of this invention to provide an apparatus for detecting conductor faults employing a minimum of electronic parts to minimize weight and cost.

Another object of this invention is to provide an electronic apparatus for detecting conductor faults employing a stationary radio receiver and a portable radio signal generator.

A further object of this invention is to provide an apparatus for detecting conductor faults including a portable radio frequency signal oscillator and stationary radio frequency amplifiers provided with means for modulating and comparing the signals received in the amplifiers from the faulty conductor.

Another object of this invention is to provide an apparatus for detecting a break in an electrical conductor in which radio signals induced on either side of the break are received and modulated with a different audio signal for the purpose of comparison in order to locate the position of the break.

Another object of this invention is to provide an electronic apparatus for detecting conductor faults in which the total number of amplification stages in both the receiver and generator are minimized.

Another object of this invention is to provide an apparatus for detecting conductor faults which can operate on a minimum of power input and which will minimize interference with other radio or electronic instruments in the vicinity.

A further object of this invention is to provide an apparatus for detecting conductor breaks in which the leakage error across the break is minimized.

Further objects and advantages of the invention will be apparent from the following description taken in conjunction with the drawings, wherein.

As previously stated, the invention contemplates a portable generator including a transistor oscillator and a mutually inductive probe for generating a radio signal. The probe is placed adjacent the conductor to be tested and produces a magnetic field which induces a small current in the conductor of radio frequency. The apparatus also includes a stationary receiver having a pair of radio frequency amplifiers, connected to opposite ends of the tested conductor. The radio signal received by each amplifier is modulated by the signal from an audio oscillator, each of which produces a different audio frequency. These audio signals are then demodulated from their respective radio carriers, and submitted through a common amplifier to a loud speaker or other type of transducer for converting the electrical audio signals to sound waves or tones for comparison. One tone will indicate the tracing generator probe is on one side of the break, while a different tone will indicate that the probe is on the other side of the break. Blended tones from the loud speaker will indicate that the probe has located the break in the conductor.

Figure 1:
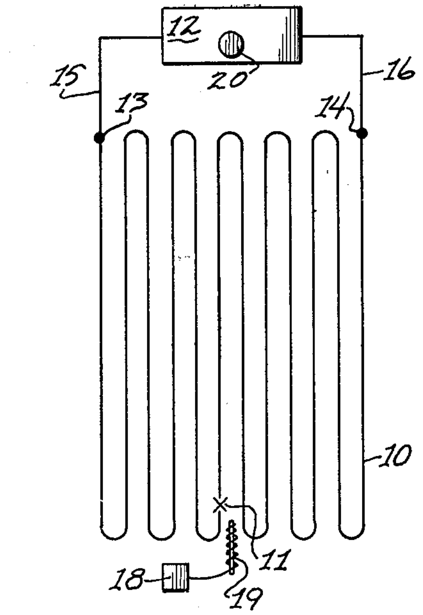
FIG. 1 is a schematic view of the invention as it is applied to locate a break in a radiant heating coil.

Referring now to the drawings in more detail, FIG. 1, discloses a representative electrical conductor, such as a radiant heating coil 10, which is generally concealed either in the ceiling of a room or imbedded in concrete in the floor, in such a manner that mere observation would not detect the location of a break 11 in the coil. In accordance with this invention, a receiver 12 is connected by its two radio input signal terminals 13 and 14 to opposite ends of the conductor or coil 10 through leads 15 and 16, respectively. A signal generator 18 having a tracing inductor probe 19 is then moved along the conductor 10 to generate a radio frequency signal in the conductor. When the probe 19 is adjacent any portion of the conductor 10 between the break 11 and the terminal 13, the receiver 12 will receive a signal only through the lead 15 which will produce a distinct audible tone in the loud speaker 20. When the probe 19 is between the break 11 and the terminal 14, only the lead 16 will convey a radio signal to the receiver 12, which will ultimately produce an audible signal of a different tone through the loud speaker 20. When the probe 19 is adjacent the break 11, radio signals will be transmitted through both portions of the coil 10 on opposite sides of the break 11 and through both input leads 15 and 16 to the receiver 12 to produce blended tones in the loud speaker 20. Thus, the blended tones will indicate the exact location of the break 11 in the conductor 10.

The generator 18 is especially designed to be lightweight and portable and to produce a high quality radio signal with a minimum of power in the conductor 10. A preferred form of the generator 18 is disclosed in the circuit diagram of FIG. 2. The generator circuit comprises a transistor 23 of the PNP type having a grounded emitter circuit 24 including a resistor 25 and a capacitor 26 in parallel. The collector circuit 27 terminates in the negative side of a battery 28 and includes an inner inductor coil 29 wound around a ferrite core 30 of the probe 19. The base circuit 31 includes an outer inductor coil 32 of fewer windings encircling the inner coil 29 and the ferrite core 30 in order to produce mutual induction. One successfully employed probe 19 included an inner coil 29 of 35 turns and an outer coil 32 of 6 turns. The other end of the base circuit 31 is grounded through a capacitor 33, and the base circuit 31 is connected in parallel to the collector circuit 27 and the negative battery terminal through a resistor 34. The collector circuit 27 is also grounded through a capacitor 35 between the transistor 23 and the probe 19. The positive side of the battery 28 is grounded through a switch 36. By using a lightweight battery 28, the total weight of all the elements disclosed in the generator circuit 18 are quite small and light. Thus, the preferred form of the generator 18 is a transistorized oscillator circuit in which the mutually inductive circuits include a ferrite core and which will produce low frequency of excellent stability.

Figure 3:
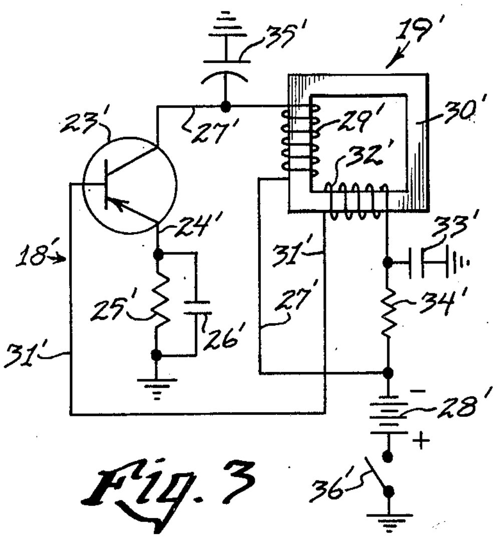
FIG. 3 is a modification of FIG. 2.
Figures 2, 4:
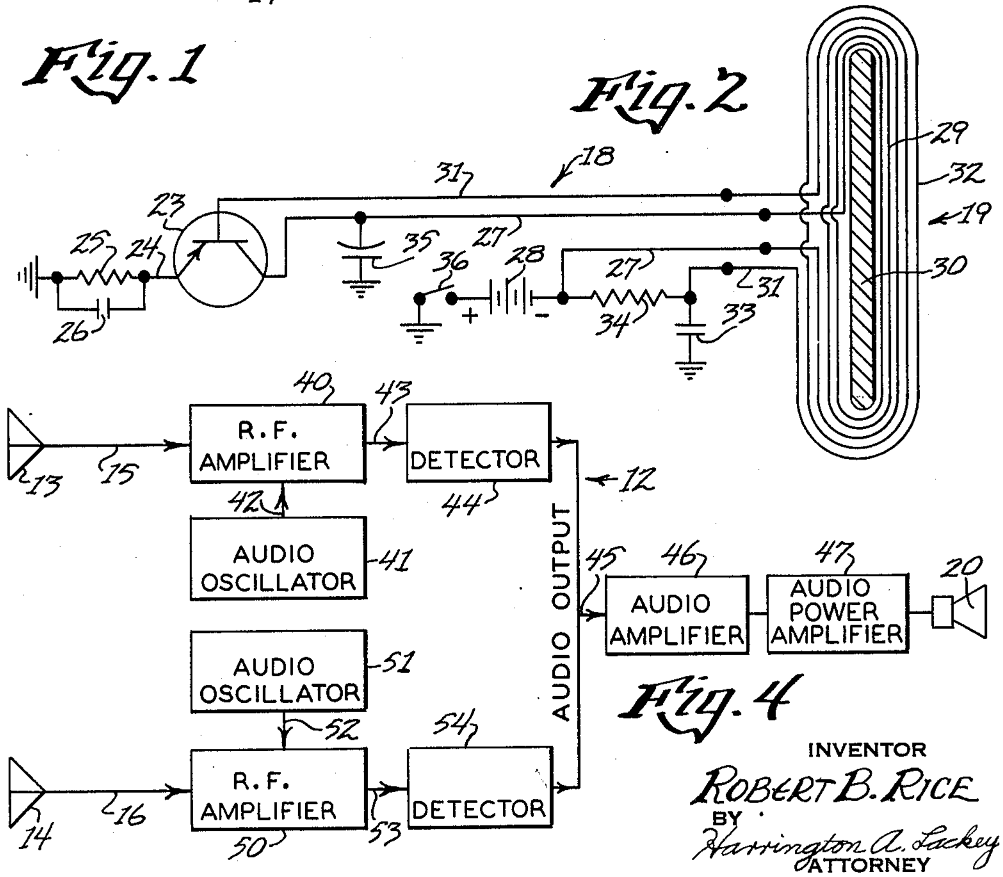
FIG. 2 is a schematic electrical diagram of the signal generator made in accordance with this invention.
FIG. 4 is a schematic block diagram of the receiver made in accordance with this invention.

FIG. 3 discloses a modification of FIG. 2 in which the probe 19′ comprises a ferrite loop antenna 30′ about which are wound the mutually inductive coils 29′ and 32′. The remaining elements of the circuit in FIG. 3 are identical to those disclosed in FIG. 2, and corresponding elements have been designated by "prime" reference numerals.

FIG. 4 discloses, in a simplified manner, the major operating components of the receiver 12. The radio frequency amplifier 40 is adapted to receive through the input lead 15 any radio freqeuncy induced in the conductor 10 between the terminal 13 and the break 11. This signal received in the amplifier 40 is modulated by a signal having a distinct audio frequency transmitted from the audio oscillator 41 through the lead 42. The modulated signal is then transmitted through the lead 43 to be demodulated in the detector 44. The remaining audio output signal from the detector 44 is then transmitted to the common amplifier circuit 45, where the audio signal is transmitted through the first and second stage amplifiers 46 and 47, respectively, to the loud speaker 20.

In a similar manner, a tone having a different audio frequency is generated by the audio oscillator 51 and transmitted through the lead 52 to modulate any radio frequency induced in the conductor 10 between the break 11 and the terminal 14 and received in the amplifier 50 through the lead 16. This modulated signal is then transmitted through the lead 53 to be demodulated in the detector 54. The remaining audio output signal, which is distinct from the output of detector 44 is transmitted to the same common amplifier circuit 45 to pass through the amplifier stages 46 and 47 to the loud speaker 20. Such a receiver circuit provides for reception of a distinct signal from the conductor on either side of the break 11 or of both signals simultaneously when the probe 19 has located the break 11.

Figure 5:
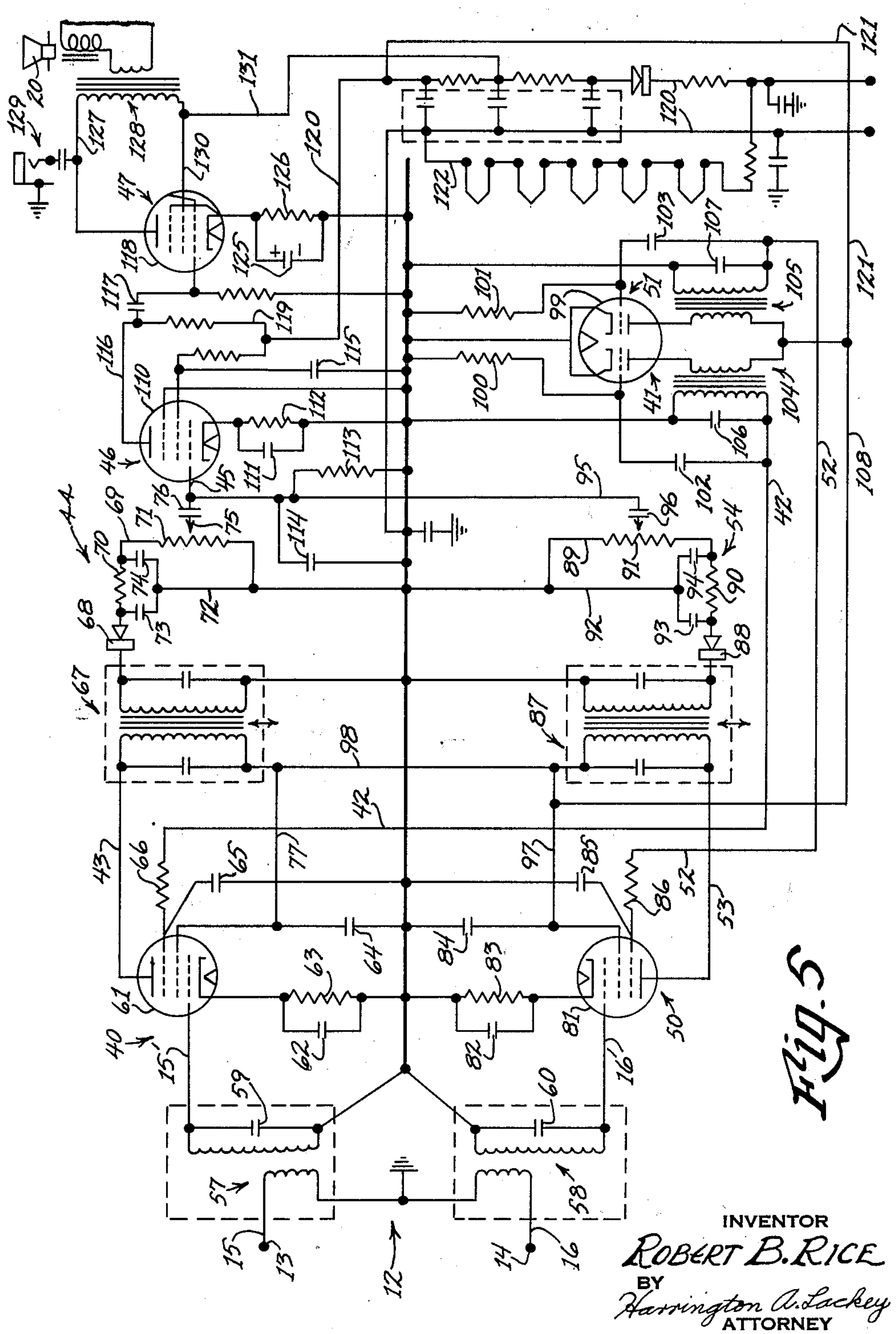
FIG. 5 is a schematic electrical diagram of the receiver made in accordance with this invention.

In the detailed receiver circuit diagram of FIG. 5, the input leads 15, 15′ and 16, 16′, respectively, include grounded transformers 57 and 58 in which capacitors 59 and 60 are connected in parallel respectively across the secondary coils. The radio frequency (RF) amplifier 40 comprises a pentode tube 61 in which the control grid is connected to the input lead 15′, the cathode is grounded through a circuit having a capacitor 62 and a resistor 63 in parallel, and the screen grid and suppressor grid are likewise grounded through capacitors 64 and 65, respectively. The lead 42 from the audio oscillator 41 is connected through the resistor 66 to the suppressor grid of the pentode tube 61. The lead 43 from the anode plate of the pentode tube 61 is coupled through the transformer 67 to the crystal diode rectifier 68 of the detector 44. The detector 44 also includes a resistive circuit 69 from the rectifier 68, including resistors 70 and 71, and a parallel capacitive circuit 72, including the parallel capacitors 73 and 74, which circuits are grounded along with the transformer 67. The audio output of the detector 44 is picked off the resistor 71 by means of the lead 75 including a capacitor 76, which is connected to the input of the common audio amplifier circuit 45. The screen grid of pentode tube 61 is connected to the primary of the transformer 67 through lead 77.

In a like manner, the input lead 16′ is connected to the control grid of the pentode tube 81 in the amplifier 50. The cathode of the tube 81 is grounded through a circuit including a capacitor 82 and a resistor 83 in parallel. The screen grid and the suppressor grid are similarly grounded through capacitors 84 and 85, respectively. The output lead 52 from the audio oscillator 51 is connected through the resistor 86 to the suppressor grid of the pentode tube 81. The output lead 53 carrying the modulated signal from the anode plate of the pentode tube 81 is coupled through the transformer 87 to a crystal diode rectifier 88 in the detector 54. The detector 54 also includes a grounded resistive circuit 89, including resistors 90 and 91, in parallel with the capacitive filter circuit 92, including the parallel capacitors 93 and 94. The audio output signal from detector 54 is picked off the resistor 91 by the lead 95, including the capacitor 96, and transmitted to the input of the common amplifier circuit 45. The screen grid of pentode tube 81 is connected to the transformer 87 through lead 97.

The audio oscillators 41 and 51 are preferably combined in a 12AU7 triode tube having grounded cathodes, and control grids grounded through resistors 100 and 101. The control grids are also connected through capacitors 102 and 103, respectively, to the output leads 42 and 52. Each of the anode plates of the tube 99 are connected through transformers 104 and 105, respectively, to their output leads 42, 52. Each secondary coil of the transformers 104 and 105 is tuned, respectively, with capacitors 106 and 107. The primary coils of the transformers 104 and 105 are connected to a common wire 108, which is connected to the lead 97 and to the lead 77 through lead 98.

In the audio amplifier circuit 45, the first stage amplifier 46 comprises a pentode tube 110 whose control grid receives the audio output from either or both the detectors 44 and 54. The cathode of the amplifier tube 110 is grounded through a circuit including the capacitor 111 and resistor 112 in parallel. The control grid of the tube 110 is grounded through the resistor 113 and may also be grounded through a parallel circuit including capacitor 114. The suppressor grid of the tube 110 is grounded, and the screen grid of the tube 110 is also grounded through a capacitor 115. A lead 116 connects the anode plate of the first stage amplifier tube 110 through a capacitor 117 to the control grid of the second stage amplifier 118. A resistive bridging circuit 119 connects the first stage amplifier output lead 116 to the screen grid of the tube 110. A power input circuit 120 is connected to the resistive circuit 119 and also through a circuit 121 to the primary coils of the audio oscillator transformers 104 and 105 and to the lead 108 for supplying power to all of the tubes 61, 81, 99, 110 and 118. The cathode heating circuit 122 is illustrative of the power connections to the heaters in each of the above tubes.

The cathode of the tube 118, which is preferably a beam power tube, is grounded through a circuit including parallel capacitor 125 and a resistor 126, and is also connected to the suppressor grid. The anode plate of the tube 118 transmits its output signal through the lead 127 to the transformer 128 of the loud speaker 20, and to a head phone jack 129. The screen grid of the tube 118 is also connected through the lead 130 in series with the anode plates through the primary coil of the transformer 128 and the lead 127. The lead 130 is also connected to the power circuit 120 through lead 131.

In operating the above apparatus for locating the break 11 in an electrical conductor, such as a radiant heater coil 10, the terminal 13 on the receiver 12 is connected to one end of the coil 10, while the terminal 14 is connected to the other end of the coil 10. The capacitors 106 and 107 in the control grid circuits of the audio oscillators 41 and 51 are adjusted to produce signals of different audio frequencies. The power circuit 120 is then connected to any suitable source of power and the receiver 12 is in operating condition for receiving and detecting the radio frequencies generated in the coil 10. The operator, carrying the portable generator 18, places the conductor probe 19 adjacent any portion of the coil 10 and begins tracing the coil. The closer the probe 19 is to the coil 10, the stronger will be the radio frequency signal generated.

By starting, for example, at the terminal 13, and moving the probe 19 along the conductor 10, a definite audible tone will be heard over the loud speaker 20 so long as the probe is in the vicinity of the coil. If the operator should start tracing the circuit from the terminal 14, a different audible tone would be heard over the loud speaker 20. When the tracing probe 19 is moved into position adjacent the break 11, a blend of both tones will be heard over the loud speaker 20.

In the event that no tone is heard over the loud speaker while tracing the coil 10, either the probe is not in the vicinity of the coil, or the traced portion of the circuit is isolated by a break at each end.

By modulating the radio frequency signals received by the amplifiers in the receiver, the number of amplifier stages are reduced. Without the modulating audio oscillators, about four amplification stages would be needed, plus a beat oscillator, for each receiving circuit.

It is also to be noted that this arrangement of a stationary receiver connected to each end of the conductor and a portable generator is just the reverse of conventional practice for detecting faults in which a portable receiver and a stationary generator connected to the conductor are employed. Even the conventional portable receivers require more amplification stages than are needed in the receiver made in accordance with this invention.

In this apparatus, the frequencies of the radio signals are fixed, but the amplitude may be varied in proportion to the distance of the probe from the conductor. Also, the modulating audio frequencies are fixed but different from each other.

Another advantage of this device is that the operator of the generator may concentrate his attention on the probe while listening to the loud speaker, whereas in previous devices, the operator might have to divide his attention between looking at a meter or gauge and noticing the location of the probe. This apparatus may also eliminate the use of headphones which have previously proved troublesome, wherever tracing of the conductor is within the range of the loud speaker. A jack 129 is provided for headphones where the probe must be used at great distances from the receiver.

This apparatus operates on very low power and consequently will not interfere with other radio or electronic devices in the vicinity, such as a household radio. Moreover, by operating at such lower power, no license would be required for its operation under the Federal Communications Commission. This conductor fault detector is constructed of a minimum number of simple, light and rugged components, which are inexpensive to assemble and maintain. This apparatus also eliminates the extra equipment and circuitry for tuning the receiver to the frequency of the generator or oscillator, since no re-tuning is required.

The small current which is induced in the conductor by the generator 18 and the low impedance of the conductor 10 result in low voltages which will permit very little current to cross a break 11 where resistance appears across the break, such as moisture. Such moisture resistances sometimes appear in concrete floors or other damp media where heating coils or other electrical conductors are imbedded. Transmission of high power signals through the conductor is less effective than low power signals where resistances appear across the break 11 since there is a greater possibility of conductance or leakage of the current through the break. Consequently, no signal or an indistinct signal of the location of a break will result from high power current transmission.

It will be apparent to those skilled in the art that various changes may be made in the invention without departing from the spirit and scope thereof, and therefore the invention is not limited by that which is shown in the drawings and described in the specifications, but only as indicated in the appended claims.

What is claimed is:

1. An apparatus for detecting and locating an open circuit in an electrical conductor having a first end and a second end, comprising:
   (*a*) a portable generator, physically detached from said conductor, for inducing a radio signal in said conductor when said generator is in the vicinity of said conductor,
   (*b*) a first radio receiver connected to said first end for receiving said radio signal when induced in said conductor between said first end and said open circuit,
   (*c*) a second radio receiver connected to said second end for receiving said radio signal when induced in said conductor between said second end and said open circuit,
   (*d*) first means for modulating the radio signal received by said first receiver with a first audio signal of predetermined frequency.
   (*e*) first means for detecting the first modulated signal to produce a first audio output signal,
   (*f*) second means for modulating the radio signal received by said second receiver with a second audio signal having a different frequency from said first audio signal,
   (*g*) second means for detecting the second modulated signal to produce a second audio output signal of different frequency from said first audio output signal.

2. The invention according to claim 1 in which said generator comprises an oscillator and a tracing probe adapted to produce a magnetic field for inducing a radio signal in said conductor when said probe is adjacent the conductor.

3. An apparatus for detecting and locating an open circuit in an electrical conductor having a first end and a second end, comprising:
   (*a*) a portable generator, physically detached from said conductor, for inducing a radio signal in said conductor when said generator is in the vicinity of said conductor,
   (*b*) a first radio receiver connected to said first end for receiving said radio signal when induced in said conductor between said first end and said open circuit,
   (*c*) a second radio receiver connected to said second end for receiving said radio signal when induced in said conductor between said second end and said open circuit,
   (*d*) said first radio receiver comprising in series a first radio frequency amplifier and a first detector,
   (*e*) said second radio receiver comprising in series a second radio frequency amplifier and a second detector,
   (*f*) a first audio oscillator operative to modulate the radio signal received in said first amplifier with a first audio signal of predetermined frequency,
   (*g*) a second audio oscillator operative to modulate the radio signal received in said second amplifier with a second audio signal of a frequency different from said first audio signal, so that the demodulated output signals from said first and second detectors will have audio frequencies of different values,
   (*h*) a transducer for converting electrical audio signals to audible tones,
   (*i*) an audio amplifier circuit for feeding said first and second audio output signals from said detectors to said transducer, so that said transducer produces a first distinct audible tone when said radio signal is received only by said first receiver, a second distinct audible tone when said radio signal is received only by said second receiver, and a third blended audible tone when said radio signal is received by both said first and second receivers.

4. The invention according to claim 3 in which said transducer is a loud speaker.

5. The invention according to claim 3 in which each radio frequency amplifier comprises a pentode tube having a suppressor grid, and in which each audio oscillator is connected to the suppressor grid of its corresponding amplifier for the purpose of modulating the radio signal in each corresponding receiver.

6. The invention according to claim 3 in which said detectors comprise crystal rectifiers.

7. The invention according to claim 3 in which said amplifier circuit comprises a pentode tube first stage amplifier and a second stage amplifier.

8. The invention according to claim 3 in which said generator comprises a transistorized oscillator circuit including a tracing probe comprising a ferrite core and mutual inductance coils around said core.

9. The invention according to claim 3 in which said generator induces a low-power, constant, radio-frequency, alternating current, the amplitude of said current varying with the distance of said generator from the conductor, and the audio output signals from said detectors varying proportionately with the amplitude of the induced radio signals in said conductor.

References Cited by the Examiner

UNITED STATES PATENTS

| | | | |
|---|---|---|---|
| 2,315,450 | 3/43 | Nyquist | 324—52 |
| 2,471,417 | 5/49 | Dimmick et al. | 324—52 |
| 2,603,686 | 7/52 | Lloyd | 324—52 |
| 2,797,386 | 6/57 | Callan | 324—34 |

WALTER L. CARLSON, *Primary Examiner.*

SAMUEL BERNSTEIN, *Examiner.*